United States Patent [19]
Mizobuchi et al.

[11] Patent Number: 6,036,439
[45] Date of Patent: Mar. 14, 2000

[54] FRONT COVER OF A TORQUE CONVERTOR HAVING A BOSS FORMED ON THE FRONT COVER AND A METHOD FOR FORMING THE BOSS ON THE FRONT COVER

[75] Inventors: Naoki Mizobuchi; Hideki Tanishiki, both of Neyagawa, Japan

[73] Assignee: Exedy Corporation, Neyagawa, Japan

[21] Appl. No.: 09/050,093

[22] Filed: Mar. 30, 1998

[30] Foreign Application Priority Data

Mar. 31, 1997 [JP] Japan .................................. 9-081256

[51] Int. Cl.$^7$ .................................................. B21D 22/26
[52] U.S. Cl. .................................... 415/213.1; 415/182.1; 415/214.1; 416/197 C; 416/180; 72/340; 72/348; 72/379.2
[58] Field of Search ................................. 415/182.1, 200, 415/213.1, 214.1, 215.1; 416/197 C, 180; 60/330; 72/348, 379.2, 340; 29/557, 558

[56] References Cited

U.S. PATENT DOCUMENTS 5,282,362   2/1994   Renneker et al. ........................ 60/345

FOREIGN PATENT DOCUMENTS 0306022   12/1989   Japan ...................................... 72/348

*Primary Examiner*—Edward K. Look
*Assistant Examiner*—Liam McDowell
*Attorney, Agent, or Firm*—Shinjyu An Intellectual Property Firm

[57] ABSTRACT

The invention relates to a boss formed on a front cover. The boss is formed by deforming a portion of a front cover material, at a central portion thereof, such that the boss is formed unitarily with the front cover. The boss is further deformed to form a central indentation on an end surface thereof. Further, the cylindrical sides of the boss are machined to form an alignment surface.

4 Claims, 7 Drawing Sheets

FRONT COVER OF A TORQUE CONVERTOR HAVING A BOSS FORMED ON THE FRONT COVER AND A METHOD FOR FORMING THE BOSS ON THE FRONT COVER

BACKGROUND OF THE INVENTION

A. Field of the Invention

The present invention is related to a boss of a front cover of a torque converter and a method for producing the boss.

B. Description of Related Art

A torque converter is a device having three types of fluid engaging elements, an impeller, a turbine, and a stator all of which are disposed within a housing. Torque is transmitted by the torque converter from the impeller to the turbine by movement of hydraulic fluid within the housing. The impeller is fixed to a front cover, the impeller and the front cover defining the torque convertor housing. The front cover is connected to a rotary body such as a flex-plate on a engine side and torque is transmitted to a transmission side by means of the hydraulic fluid moving from the impeller to the turbine.

Conventionally, the front cover is joined by via a welding process to a centering boss, the boss being formed by press processing and then welded to a central portion of the front cover. Prior to being joined with the boss, a central portion of the front cover is cut out and is discarded as scrap. The boss is required for positioning and aligning the front cover and torque convertor with the flex plate on the engine side.

Alternatively, a front cover is contemplated wherein an integrated boss is formed by a press processing at the center of the front cover such that the front cover and the boss are unitarily formed from a single material. Thus, the welding process is avoided. The unitary configuration where the boss and the front cover are integrally formed from a single material reduces the number of parts. The unitary configuration also reduces material waste; improves material yield by making it unnecessary to cut a central portion of the front cover out; eliminates scraps cut from the inner peripheral portion of the front cover; eliminates the need for the welding process; and provide stable airtight characteristics because there are no welded portions.

Figure 5:
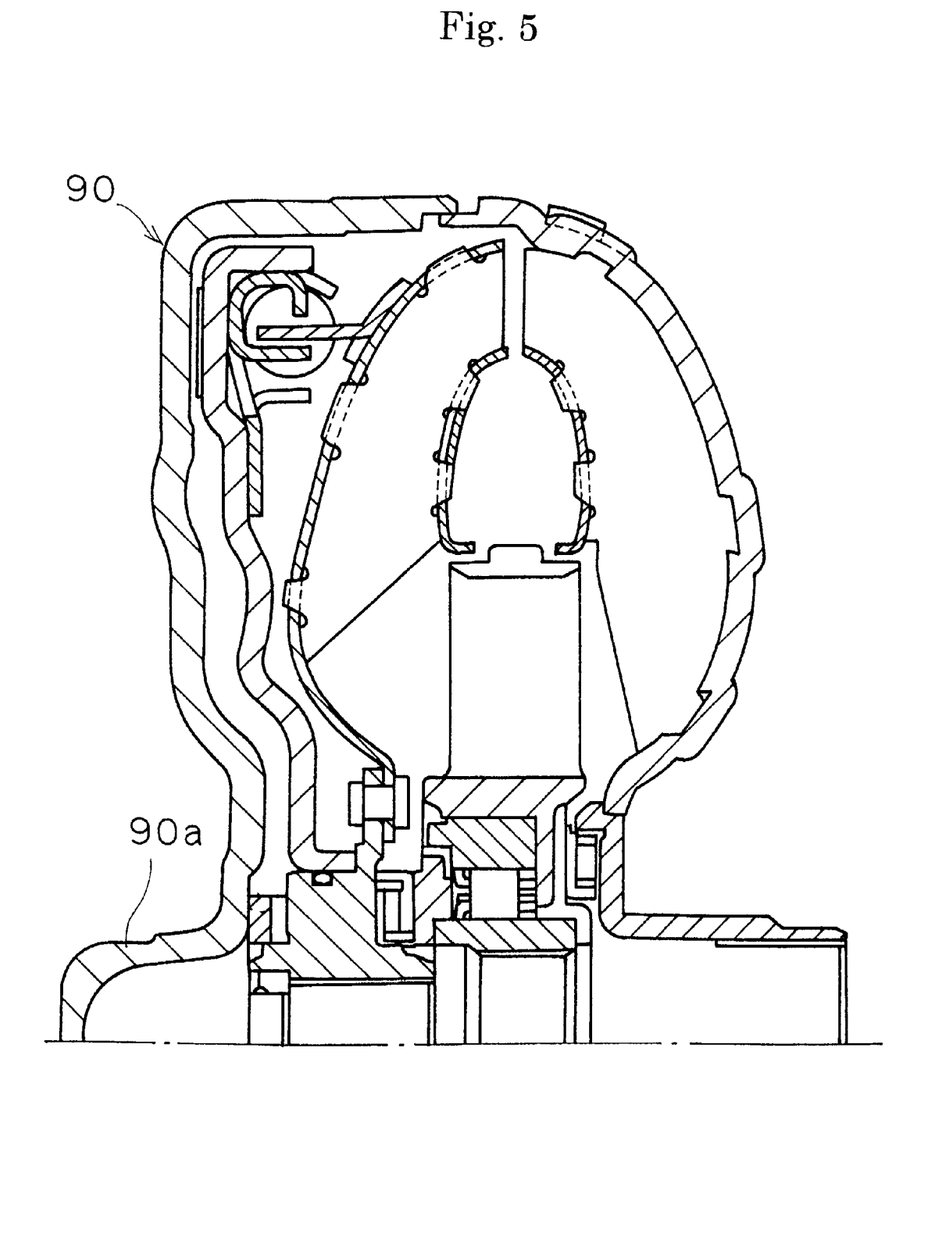
FIG. 5 is a schematic cross section of a front cover that includes a boss formed by a prior art method.
Figure 6:
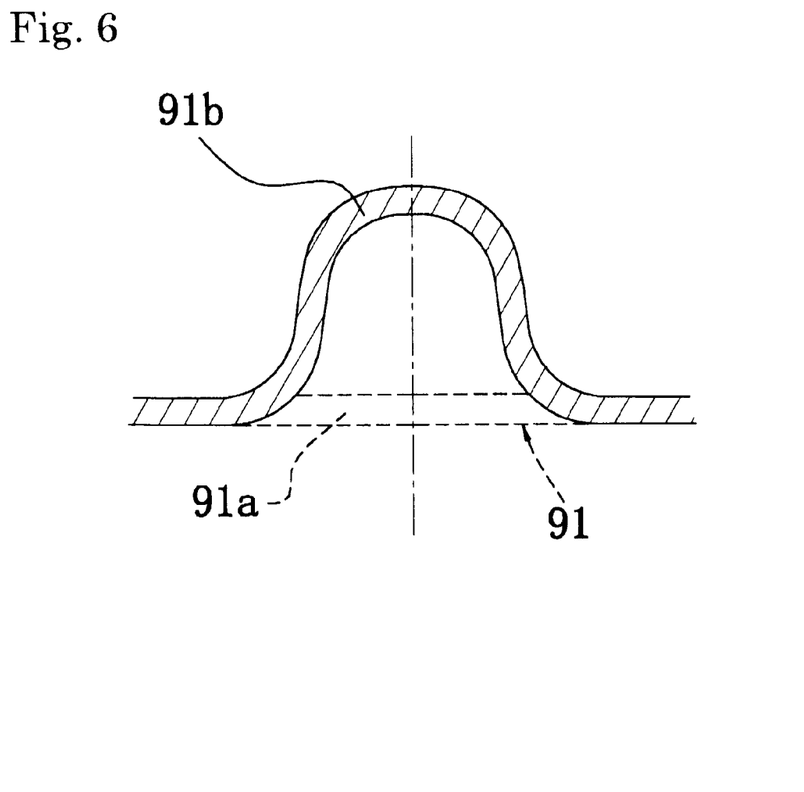
FIG. 6 is a cross section of the boss depicted in FIG. 5 undergoing one step in a formation process.
Figure 7:
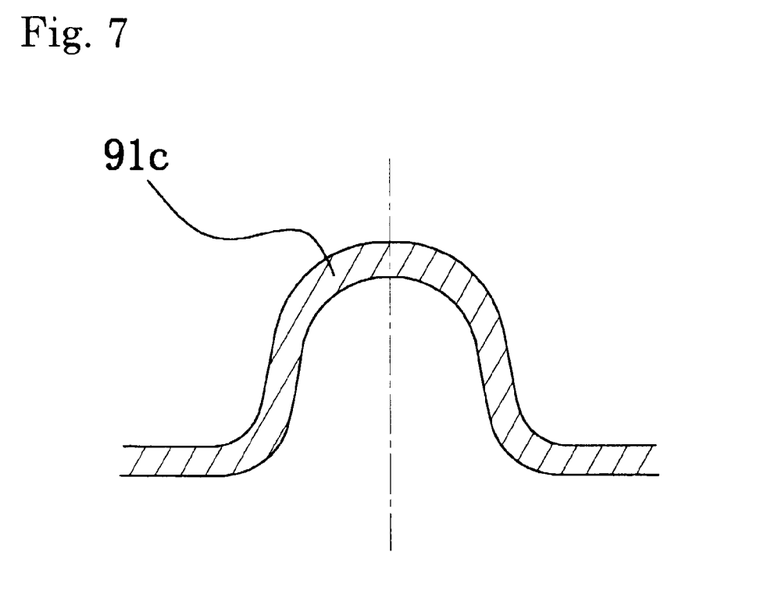
FIG. 7 is a cross section of the boss depicted in FIGS. 5 and 6 undergoing another step in the press formation process.
Figure 8:
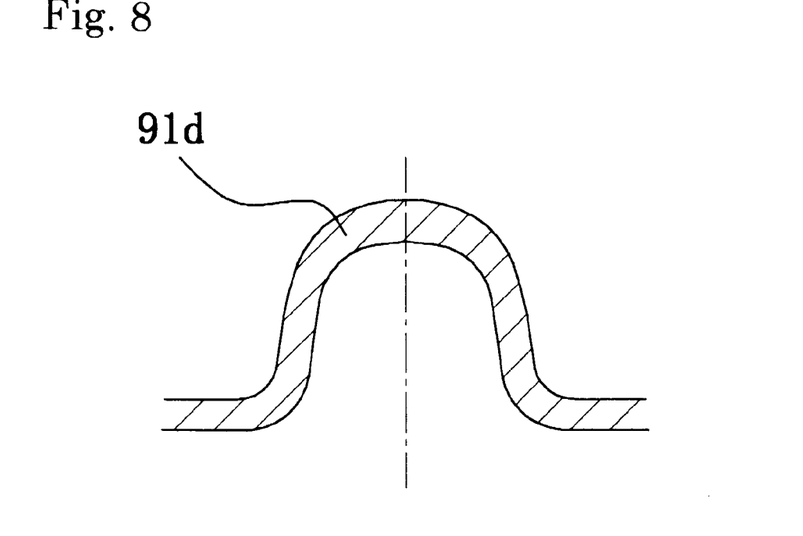
FIG. 8 is a cross section of the boss depicted in FIGS. 5, 6 and 7 after undergoing still another step in the press formation process.
Figure 9:
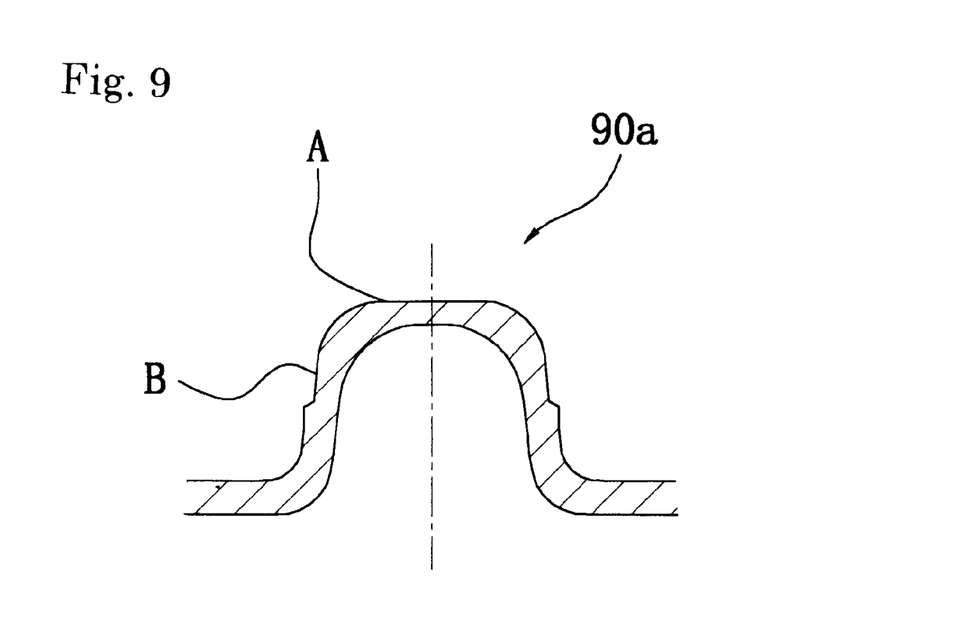
FIG. 9 is a cross section of the boss depicted in FIGS. 5, 6, 7 and 8 after undergoing yet another step in the press formation process including a surface finishing step.

In order to form the above-mentioned unitary configuration of the front cover and boss, several steps must be carried out. For example, to form a boss 90a of a front cover 90, as shown in FIG. 5, a number of steps must be carried out. First, a first preliminary pressing or deforming process is carried out on a disc-shaped material 91, shown in dotted lines in FIG. 6. A center portion 91a of the disc-shaped material 91 is deformed to form a first indentation 91b, as is indicated by the solid lines in FIG. 6. It should be understood that the disc-shaped material 91 subsequently forms the front cover 90 depicted in FIG. 5. Next, the first indentation 91b is further deformed in another pressing step to form a second indentation 91c (shown in FIG. 7) having a more rounded shape that is closer to the shape of the final boss 90a. Next, a finishing pressing process is carried out forming a third indentation 91d (shown in FIG. 8) that is still closer to the shape of the final boss 90a. Lastly, the boss is subjected to machining, such as milling, cutting and/or grinding such that the portions A, B shown in FIG. 9 are formed to define the finished boss 90a. The portions A and B are required for positioning and alignment between the front cover and parts on the engine side.

However, if the boss 90a is formed on the front cover by means of a pressing process where deformation of a material forms the boss, as described above, the radius of the boss 90a is large. Therefore, after machining the thickness of the boss 90a at some positions of the portions A and B is undesirably thin. In particular, proximate the central axis the boss is thin and at a step portion of the portion B the boss also thin. Therefore, the strength of the boss 90a and the front cover 90 is weakened due to the thin portions of the boss 90a.

SUMMARY OF THE INVENTION

The object of the present invention is to provide a boss that be formed unitarily with a front cover of a torque converter with a minimal number of manufacturing steps but can provide a means for aligning the torque converter with a corresponding component attached to an engine.

In accordance with one aspect of the present invention, a front cover of a torque converter includes a front cover member formed from a plate material and a boss formed at a central portion of the front cover member. The boss is formed unitarily with the front cover member from the plate material. The boss has a cylindrical portion extending outward from the front cover member along a central axis of the front cover member and a central portion of an end surface of the boss is formed with a depression. A portion of an outer peripheral surface of the cylindrical portion is parallel to and coaxial with the central axis of the front cover member. Further, the boss is configured for positioning the front cover of the torque converter with corresponding components of an engine.

Preferably, the cylindrical portion is formed to protrude toward the engine from the front cover member.

Preferably, one portion of the outer peripheral surface of the cylindrical portion is formed by cutting away portions of the cylindrical portion.

In accordance with another aspect of the present invention, there is a method for producing a boss on a front cover that includes the steps of deforming a central portion of a front cover of a torque converter in a first pressing process thus defining a centered indentation on the front cover. The method also includes deforming the indentation in a second pressing process wherein a die and restricter are used, the restricter having a protrusion for forming an indentation on the boss. Finally, a machining step is conducted wherein an end portion of the boss is machined to form a recess on a cylindrical outer surface of the boss.

These and other objects, features, aspects and advantages of the present invention will become more fully apparent from the following detailed description of the present invention when taken in conjunction with the accompanying drawings where like reference numerals denote corresponding parts throughout.

DETAILED DESCRIPTION OF THE INVENTION

Figure 1:
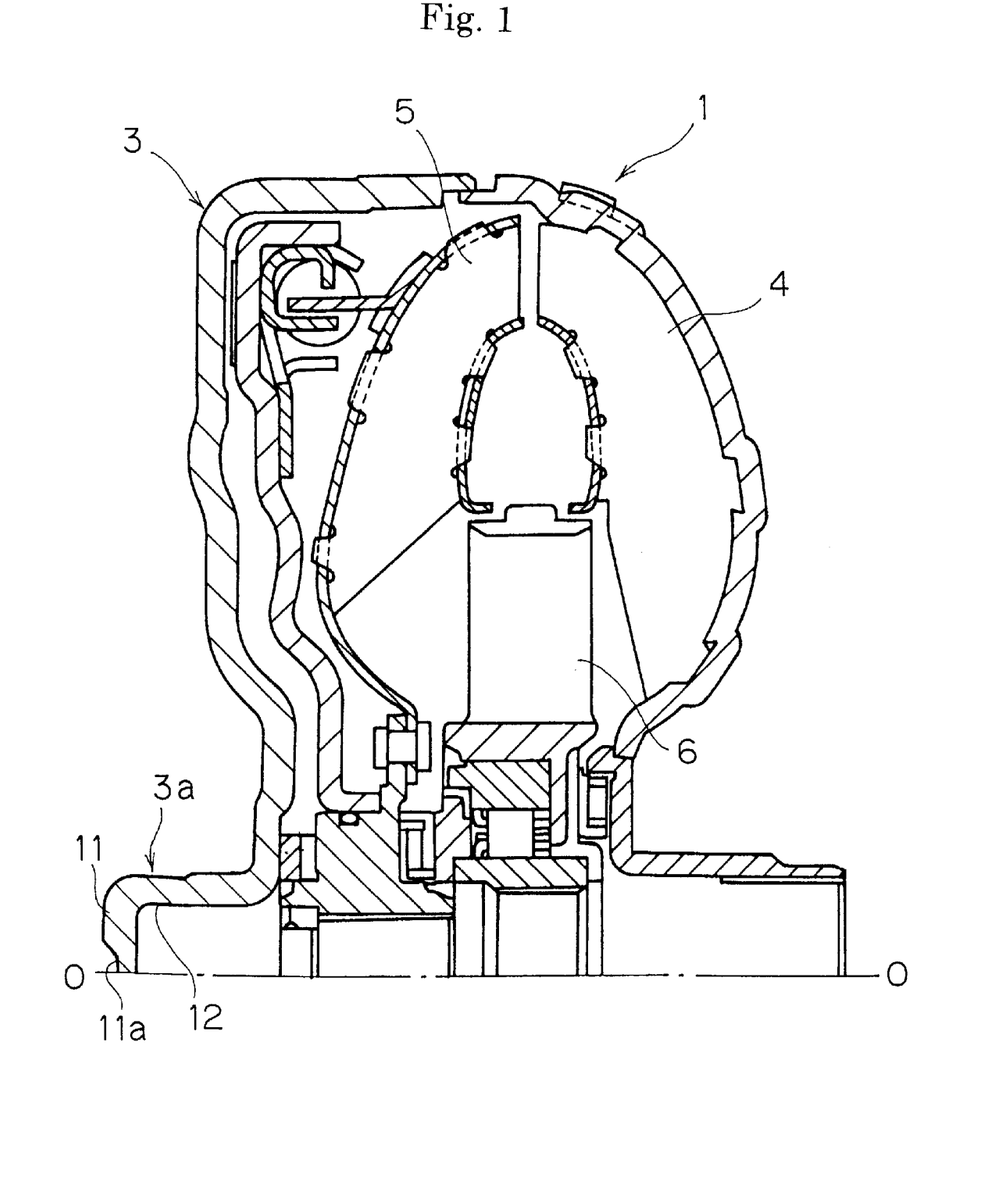
FIG. 1 is a schematic cross section of a front cover and a torque converter that includes a boss in accordance with one embodiment of the present invention.

FIG. 1 shows a front cover 3 formed with a boss 3a in accordance with one embodiment of the present invention. A torque converter 1 includes the front cover 3. In FIG. 1., the line O—O is the axis of rotation of the torque converter 1. An engine (not shown) is disposed on the left side of the figure and the transmission (not shown) is disposed to the right side of FIG. 1.

The torque converter 1 is mainly a mechanism to transfer torque from a crankshaft on the engine side to a main driveshaft of the transmission. The torque converter 1 includes the front cover 3 whose outer peripheral portion is coupled to the crankshaft and a torque converter main body that includes an impeller 4, a turbine 5 and a stator 6. The front cover 3 and the impeller 4 are welded at an outer peripheral portion and together define a hydraulic fluid chamber. Torque from the crankshaft to the front cover 3 is output to the main driveshaft that is coupled to the turbine 5 by means of the hydraulic fluid flowing from the impeller 4 to the turbine 5.

The boss 3a is formed on the inner peripheral portion of the front cover 3 such that the boss 3a protrudes toward the engine side (the left side of FIG. 1). The boss 3a is provided for positioning and aligning parts on the engine side when installing the torque converter 1 in a vehicle (not shown). The boss 3a includes an engine side disc portion 11 and a cylindrical portion 12. The engine side disc portion 11 has a disc-like shape and is formed with a depression 11a. The cylindrical portion 12 extends from a central portion of the front cover 3 toward the engine side where it continuously joins with the disc portion 11. Portions of the outer peripheral surface of the cylindrical portion 12 are parallel to the axis O—O of the torque converter 1 and provide a positioning surface for corresponding parts of the engine (not shown).

Next, a method for producing the boss 3a on the front cover 3 is described.

Figure 2:
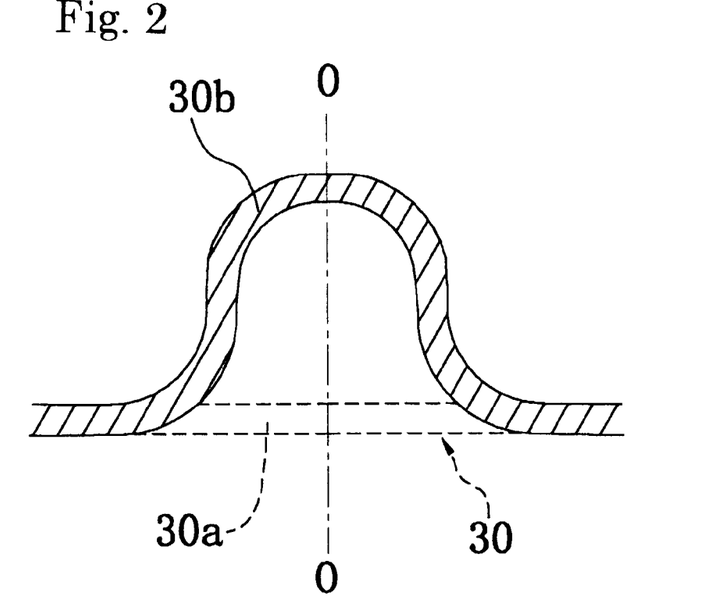
FIG. 2 is a cross section of the boss depicted in FIG. 1 undergoing one step in a formation process.
Figure 3:
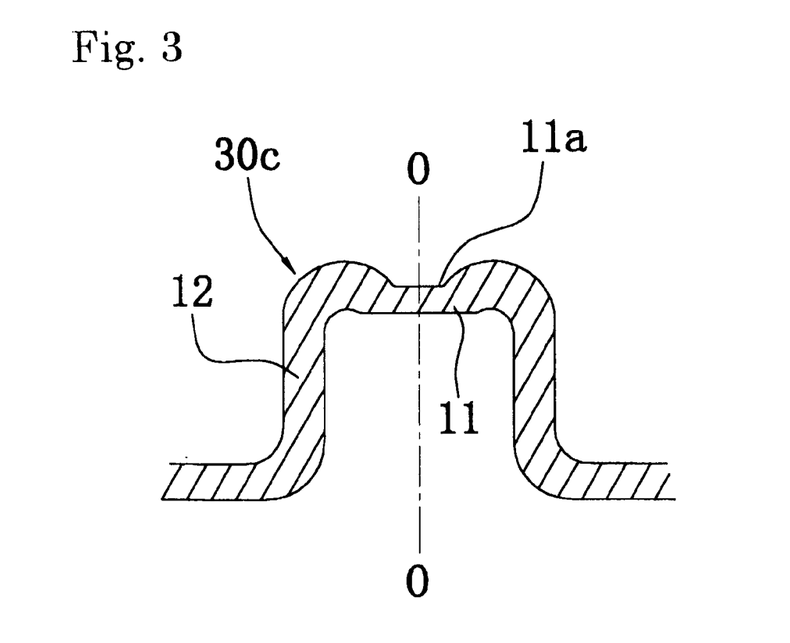
FIG. 3 is a cross section of the boss depicted in FIGS. 1 and 2 after undergoing another step in the formation process.
Figure 4:
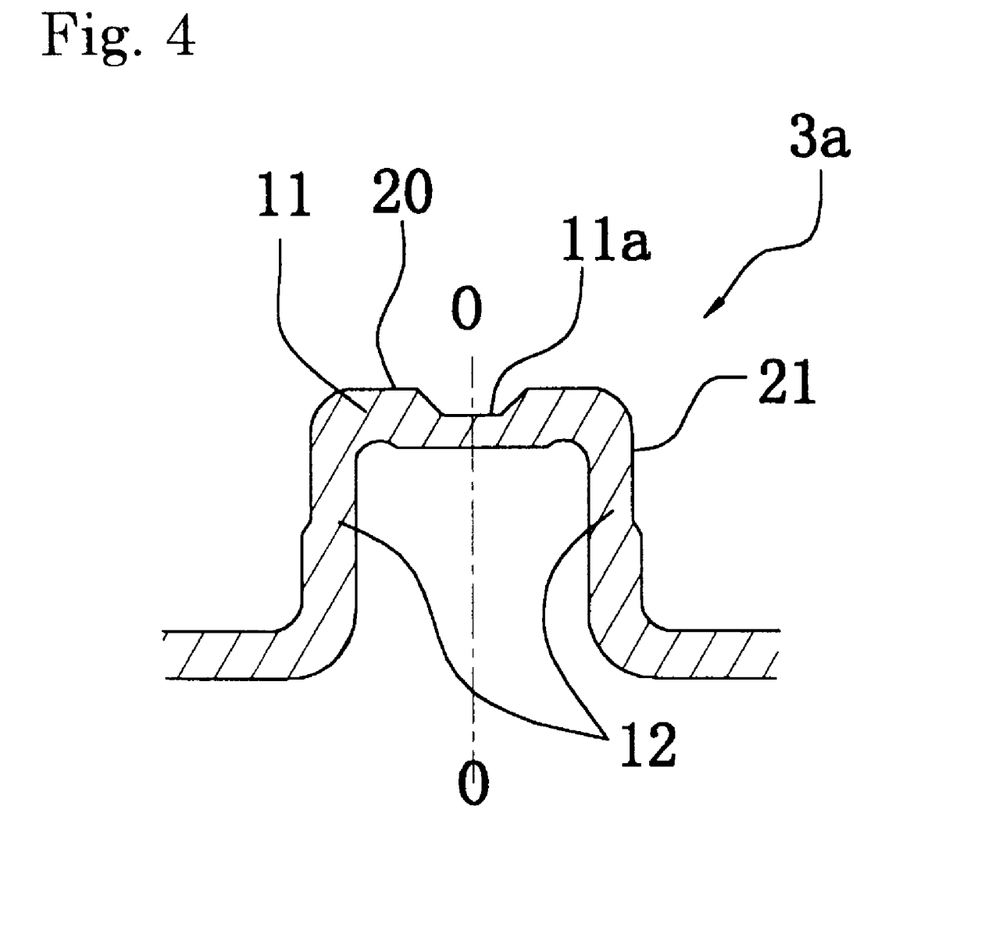
FIG. 4 is a cross section of the boss depicted in FIGS. 1, 2 and 3 after undergoing still another step in the formation process, including a surface finishing step.

First, a disc-shaped material 30 is provided for subsequent formation into the front cover 3. The disc-shaped material 30 has a center portion 30a, shown in FIG. 2 in phantom. The center portion 30a is initially subjected to a preliminary pressing step to form the intermediate indentation 30b as indicated by the solid lines in FIG. 2. Next, a finish pressing step is carried out on the material 30 that includes the indentation 30b to form the shape depicted in FIG. 3. Specifically, in the finish pressing process, an indentation 30c is formed along with the indentation 11a onto the indentation 30b, thus being closer to the final shape of the boss 3a. Thereafter, as shown in FIG. 4, an annular surface 20 on the outer peripheral surface of the cylindrical portion 12 is formed and a cylindrically shaped surface 21 on a portion of the cylindrical portion 12 is also formed. The annular surface 20 and the cylindrically shaped surface 21 are formed by any of a number of machining processes, such as cutting, grinding or similar fine machining technique.

Figure 10:
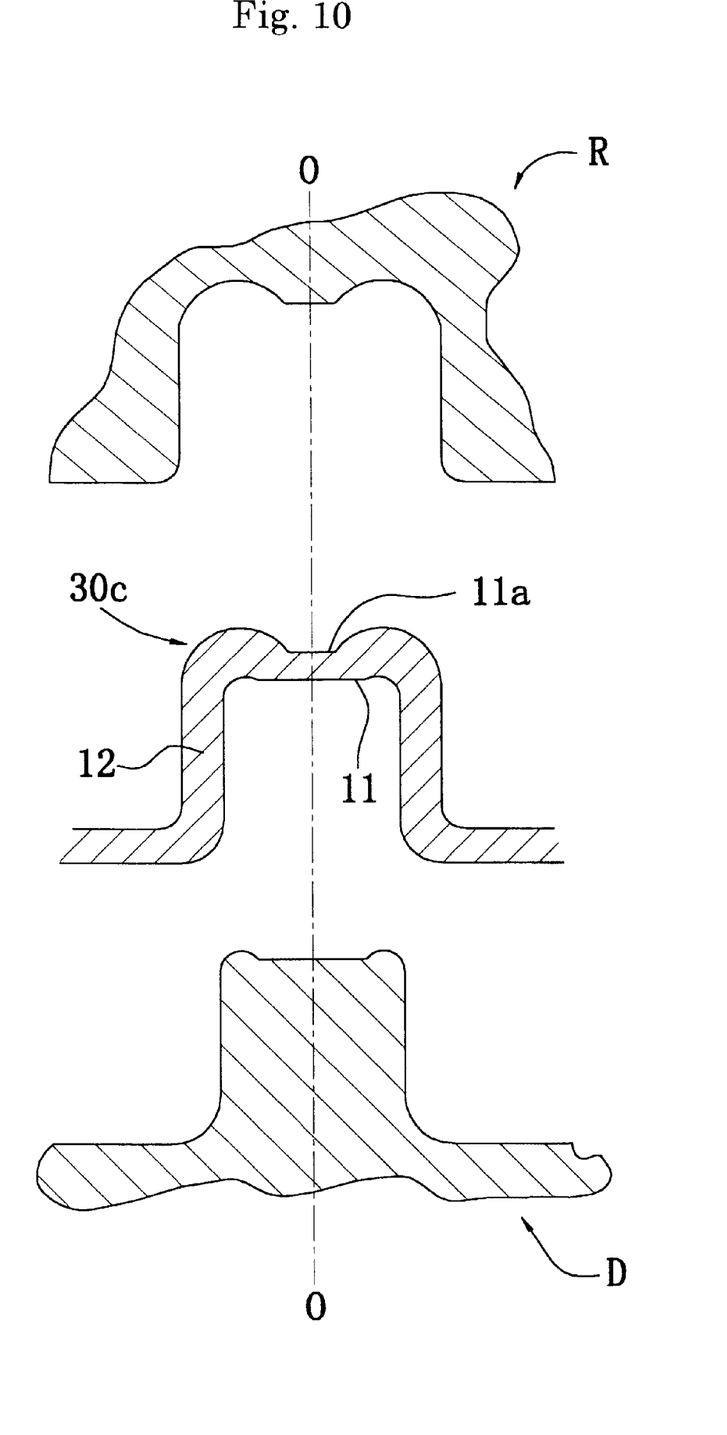
FIG. 10 is a cross section of the boss depicted in FIG. 3, and further depicting a restricter and die used in forming the boss in accordance with the embodiment of the present invention depicted in FIGS. 1, 2, 3 and 4.

Hereupon, because a preliminary pressing step is carried out, the occurrence of cracks and fractures inside the boss 3a is controlled during the finish pressing step. Further, the finish pressing step is carried out using a restrictor R to form the shape of the engine side disc portion 11. The restrictor R, shown in FIG. 10 with a corresponding die D, is formed with surfaces having a protrusion corresponding to the depression 11a and an annular rounded portion corresponding to the corner portion 30c. The restrictor R therefore provides a means for forming the engine side shape of disc portion 11 and the cylindrical portion 12. Therefore, the machining operation is minimal and only a minimum amount of material must be removed in order to form the boss 3a in its final shape, the final shape being depicted in FIGS. 1 and 4. Further, by minimizing the amount of material machined from the boss 3a, the plate thickness of the boss 3a is more consistent and undesirable thinness of portions of the boss 3a is minimized if not eliminated.

Further, the depression 11a can be used as a center hole for centering during the processes such as the press process of the outer peripheral portion of the front cover 3.

In the present invention, because boss 3a is formed with the depression 11a, there is a reduction in the amount of material which must be cut or machined away from the boss 3a in the manufacturing process. Further, the number of manufacturing steps is minimized and the strength of the boss is ensured as well.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A front cover of a torque converter comprising:
   a front cover member formed from a plate material;
   a boss formed at a central portion of said front cover member formed unitarily with said front cover member from said plate material, said boss having a cylindrical portion extending outward from said front cover member along a central axis of said front cover member, a central portion of an end surface of said boss being formed with a depression, a portion of an outer peripheral surface of said cylindrical portion being parallel to and coaxial with said central axis of said front cover member; and
   wherein said boss is configured for positioning the front cover of the torque converter with corresponding components of an engine.

2. The front cover as set forth in claim 1 wherein said cylindrical portion is formed to protrude toward the engine from said front cover member.

3. The front cover as set forth in claim 1 wherein one portion of said outer peripheral surface of said cylindrical portion is formed by cutting away portions of said cylindrical portion.

4. A method for producing a boss on a front cover comprising the steps of:
   deforming a central portion of a front cover of a torque converter in a first pressing process thus defining a centered indentation on the front cover;

deforming the indentation in a second pressing process wherein a die and restrictor are used, the restrictor having a protrusion for forming an indentation on the boss;

machining an end portion of the boss to form a recess on a cylindrical outer surface of the boss.

* * * * *